(12) United States Patent
El-Wardany et al.

(10) Patent No.: US 12,084,733 B1
(45) Date of Patent: Sep. 10, 2024

(54) METHOD FOR MECHANICAL SURFACE TREATMENT USING ELECTRO-PULSE ASSISTED DEEP ROLLING

(71) Applicant: Raytheon Technologies Corporation, Farmington, CT (US)

(72) Inventors: Tahany El-Wardany, Vernon, CT (US); Krzysztof Barnat, Berlin, CT (US); Randy P. Salva, Baltic, CT (US); Benjamin Bedard, Manchester, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/132,687

(22) Filed: Apr. 10, 2023

(51) Int. Cl.
*B23P 15/02* (2006.01)
*B23P 9/02* (2006.01)
*C21D 7/08* (2006.01)

(52) U.S. Cl.
CPC ............... *C21D 7/08* (2013.01); *B23P 15/02* (2013.01); *B23P 9/02* (2013.01)

(58) Field of Classification Search
CPC . B12D 31/06; C21D 7/08; B23P 15/02; B23P 9/02
See application file for complete search history.

(56) References Cited

U.S. PATENT DOCUMENTS

| 3,360,630 | A | 12/1967 | Blaszkowski | |
| 9,662,765 | B2 | 5/2017 | Hüning | |
| 11,697,146 | B2 * | 7/2023 | Weigmann | B21D 43/105 72/426 |
| 2008/0315476 | A1 * | 12/2008 | Akhavan-Malayeri | B23Q 1/5437 269/58 |
| 2009/0277541 | A1 | 11/2009 | Bamberg | |
| 2014/0150514 | A1 * | 6/2014 | Wang | B21D 19/043 72/252.5 |

FOREIGN PATENT DOCUMENTS

| CN | 109940044 B | 7/2021 |
| KR | 1447096 | 10/2014 |
| RU | 2352449 C2 | 4/2009 |
| RU | 151794 U1 | 4/2015 |

* cited by examiner

*Primary Examiner* — Sarang Afzali
(74) *Attorney, Agent, or Firm* — Getz Balich LLC

(57) ABSTRACT

A mechanical surface treatment method for a workpiece includes using a multi-axis powered machine to actuate a deep rolling tool having a roller relative to the workpiece. The actuating includes applying the roller against a workpiece surface with a normal force sufficient to plastically deform the workpiece and translating the roller relative to the workpiece surface. The method includes concurrently applying an electrical current to the workpiece surface in a manner that produces an electroplastic effect at the workpiece surface and a near surface region. The electroplastic effect and the plastic deformation produce a refinement in a grain structure at the workpiece surface and near surface region and an increase in dislocation sources and tangles within the grain structure.

7 Claims, 5 Drawing Sheets

METHOD FOR MECHANICAL SURFACE TREATMENT USING ELECTRO-PULSE ASSISTED DEEP ROLLING

BACKGROUND OF THE INVENTION

1. Technical Field

This disclosure relates generally to component processing and/or repair, and more particularly to electro-pulse assisted robotic deep rolling of materials or parts.

2. Background Information

Mechanical surface treatments, such as "deep rolling process", are being used to enhance the surface strength and/or subsurface of a metallic substrate. The term "deep rolling" refers to a surface rolling treatment using rolls applied with force with the purpose of inducing deep plastic deformations and compressive residual stresses in near-surface layers of the substrate. This process is in contrast to a process often referred to as "roller burnishing" which is usually applied with much lower forces or pressures and mostly aims to obtain a compressive residual stress with low plastic strain and certain surface quality especially in terms of roughness.

A variety of parameters during the deep rolling process severely influence the near surface residual stress state. Of those parameters, the amount of rolling force or pressure is the most important in terms of achieving the desired compressive residual stress profile. The amount of rolling force applied is also significant in terms of whether a process like deep rolling can be used for a given component. In some instances, the nature/configuration of the component may limit the force that can be applied. In other instances, the tooling (e.g., robotic machines, machine tools, and the like) may be limited in the amount of tool pressure that can be generated.

SUMMARY

According to an aspect of the present disclosure, a mechanical surface treatment method for a metallic workpiece is provided. The method includes a) using a multi-axis powered machine to actuate a deep rolling tool having a roller relative to the metallic workpiece, the actuating including applying the roller of the deep rolling tool against a workpiece surface with a normal force sufficient to plastically deform the workpiece and translating the roller of the deep rolling tool relative to the workpiece surface; and b) concurrently applying an electro-pulsed current to the workpiece surface in a manner that produces an electroplastic effect at the workpiece surface and a near surface region contiguous with the workpiece surface, the electroplastic effect and the plastic deformation producing a refinement in a grain structure at the workpiece surface and a near surface region and an increase in dislocation sources and tangles within the grain structure.

In any of the aspects or embodiments described above and herein, the first multi-axis machine may be a computer numerical control (CNC) machine.

In any of the aspects or embodiments described above and herein, the first multi-axis machine may be a multi-axis robot.

In any of the aspects or embodiments described above and herein, the multi-axis robot may be configured for multiple axes of orientation and multiple axes of translation.

In any of the aspects or embodiments described above and herein, the step of applying an electro-pulsing current to the workpiece surface may include directly applying the electrical current to the workpiece surface.

In any of the aspects or embodiments described above and herein, the applying the roller of the deep rolling tool against the workpiece surface produces compressive residual stress within the workpiece.

According to an aspect of the present disclosure, a mechanical surface treatment method for a workpiece is provided. The method includes a) using a first multi-axis (FMA) powered machine to impart motion to a metallic workpiece in a first FMA axis of motion; b) using a second multi-axis (SMA) powered machine to actuate a deep rolling tool having a roller relative to the workpiece in a first SMA axis of motion, wherein the first SMA axis of motion is different from the first FMA axis of motion, the actuating including applying the roller of the deep rolling tool against a workpiece surface with a normal force sufficient to plastically deform the workpiece; and c) concurrently applying an electro-pulsing current to the workpiece surface in a manner that produces an electroplastic effect at the workpiece surface and a near-surface region contiguous with the workpiece surface, the electroplastic effect and the plastic deformation producing a refinement in a grain structure of the workpiece and an increase in dislocation sources and tangles within the grain structure.

In any of the aspects or embodiments described above and herein, wherein the method may include using the second multi-axis powered machine to actuate the deep rolling tool relative to the workpiece in a second SMA axis of motion.

In any of the aspects or embodiments described above and herein, wherein the method may include using the second multi-axis powered machine to actuate the deep rolling tool relative to the workpiece in a third SMA axis of motion.

In any of the aspects or embodiments described above and herein, wherein the method may include using the second multi-axis powered machine to actuate the deep rolling tool relative to the workpiece in a fourth SMA axis of motion.

In any of the aspects or embodiments described above and herein, the second multi-axis powered machine may be a multi-axis robot.

In any of the aspects or embodiments described above and herein, wherein the method may include using the first multi-axis powered machine to actuate the deep rolling tool relative to the workpiece in a second FMA axis of motion.

In any of the aspects or embodiments described above and herein, the first multi-axis powered machine may be a multi-axis computer numerical control (CNC) machine.

According to another aspect of the present disclosure, a method of producing a workpiece is provided. The method includes a) using an additive manufacturing to produce a first layer of fused metallic powdered material on a workpiece; b) using a multi-axis powered machine to actuate a deep rolling tool having a roller relative to the first layer of fused metallic powdered material, the actuating including applying the roller of the deep rolling tool against the first layer of fused metallic powdered material with a normal force sufficient to plastically deform the first layer of fused metallic powdered material and translating the roller relative to the first layer of fused metallic powdered material; c) concurrently applying an electro-pulsed current to the workpiece in a manner that produces an electroplastic effect at the first layer of fused metallic powdered material, the electroplastic effect and the plastic deformation producing a refinement in a grain structure of the first layer of fused metallic powdered material and an increase in dislocation sources and tangles within the grain structure; d) using the additive manufacturing to produce a second layer of fused metallic powdered material disposed on the first layer of fused metallic powdered material; e) using the multi-axis powered machine to actuate the deep rolling tool relative to the second layer of fused metallic powdered material, the actuating including applying the roller of the deep rolling tool against the second layer of fused metallic powdered material with a normal force sufficient to plastically deform the second layer of fused metallic powdered material and translating the roller relative to the second layer of fused metallic powdered material; and f) concurrently applying an electrical current to the workpiece in a manner that produces an electroplastic effect at the second layer of fused metallic powdered material, the electroplastic effect and the plastic deformation producing a refinement in a grain structure of the second layer of fused metallic powdered material and an increase in dislocation sources and tangles within the grain structure.

According to another aspect of the present disclosure, a system for applying a mechanical surface treatment to a metallic workpiece is provided that includes a deep rolling tool having a roller, a multi-axis powered machine, an electro-pulse assist unit, and a system controller. The multi-axis powered machine is configured to actuate the deep rolling tool relative to the metallic workpiece in a plurality of axes of movement, the machine configured to actuate the deep rolling tool. The electrical assist unit is controllable to selectively apply an electrical current to the workpiece surface. The system controller is in communication with the multi-axis powered machine, the electrical assist unit, and non-transitory memory storing instructions, which instructions when executed cause the system controller to: a) control the multi-axis powered machine to actuate the deep rolling tool so as to apply the roller of the deep rolling tool against a workpiece surface of the metallic workpiece with a normal force sufficient to plastically deform the metallic workpiece, and to translate the roller of the deep rolling tool relative to the workpiece surface; and b) control the electrical assist unit to applying an electrical current to the workpiece surface concurrently with the actuation of the deep rolling tool causing the plastic deformation, wherein the current is applied in a manner that produces an electroplastic effect at the workpiece surface and a near-surface region contiguous with the workpiece surface, the electroplastic effect and the plastic deformation producing a refinement in a grain structure of the workpiece and an increase in dislocation sources and tangles within the grain structure.

The foregoing features and elements may be combined in various combinations without exclusivity, unless expressly indicated otherwise. For example, aspects and/or embodiments of the present disclosure may include any one or more of the individual features or elements disclosed above and/or below alone or in any combination thereof. These features and elements as well as the operation thereof will become more apparent in light of the following description and the accompanying drawings. It should be understood, however, the following description and drawings are intended to be exemplary in nature and non-limiting.

DETAILED DESCRIPTION

The present disclosure is directed to a system 20 and method for applying a mechanical surface treatment to a metallic article/workpiece 22. The present disclosure may be used to process workpieces comprising a variety of different materials including, but not limited to, nickel, nickel alloys, aluminum, aluminum alloys, titanium, titanium alloys, steel, and the like. The present disclosure may be used to process a variety of different metallic workpieces. The present disclosure provides particular utility in processing workpieces having complex geometries. As an example, the present disclosure may be used to processing gas turbine articles such as turbine blades, compressor blades, fan blades, etc.

Figure 1:
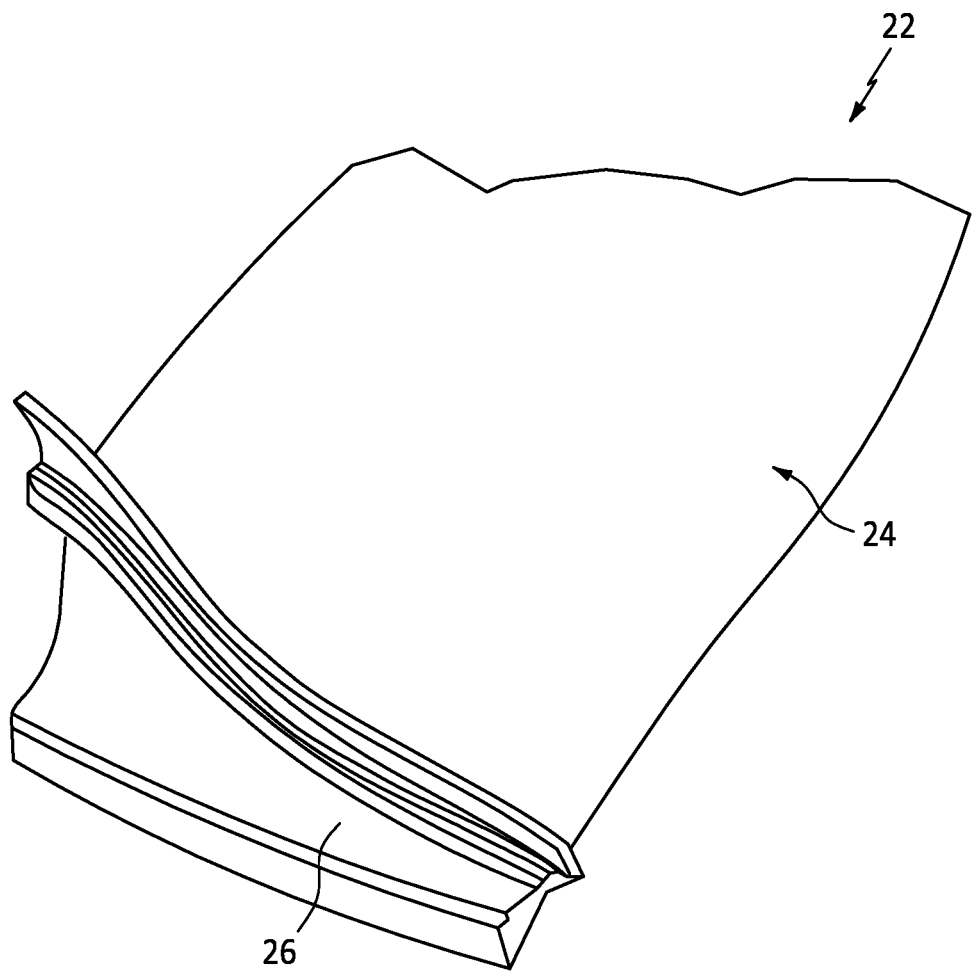
FIG. 1 is a diagrammatic representation of a workpiece.

FIG. 1 shows a workpiece 22 having an airfoil 24 and dovetail root 26. As will be described herein, a surface of the workpiece 22 is to be processed to have residual compressive stresses at the surface and near-surface region below the surface. In this example, the workpiece 22 is an aluminum alloy fan blade for a turbofan engine, but the present disclosure process can be adapted to nearly any workpiece 22 having a surface/near-surface region into which residual compression stresses are to be incorporated.

Figure 2:
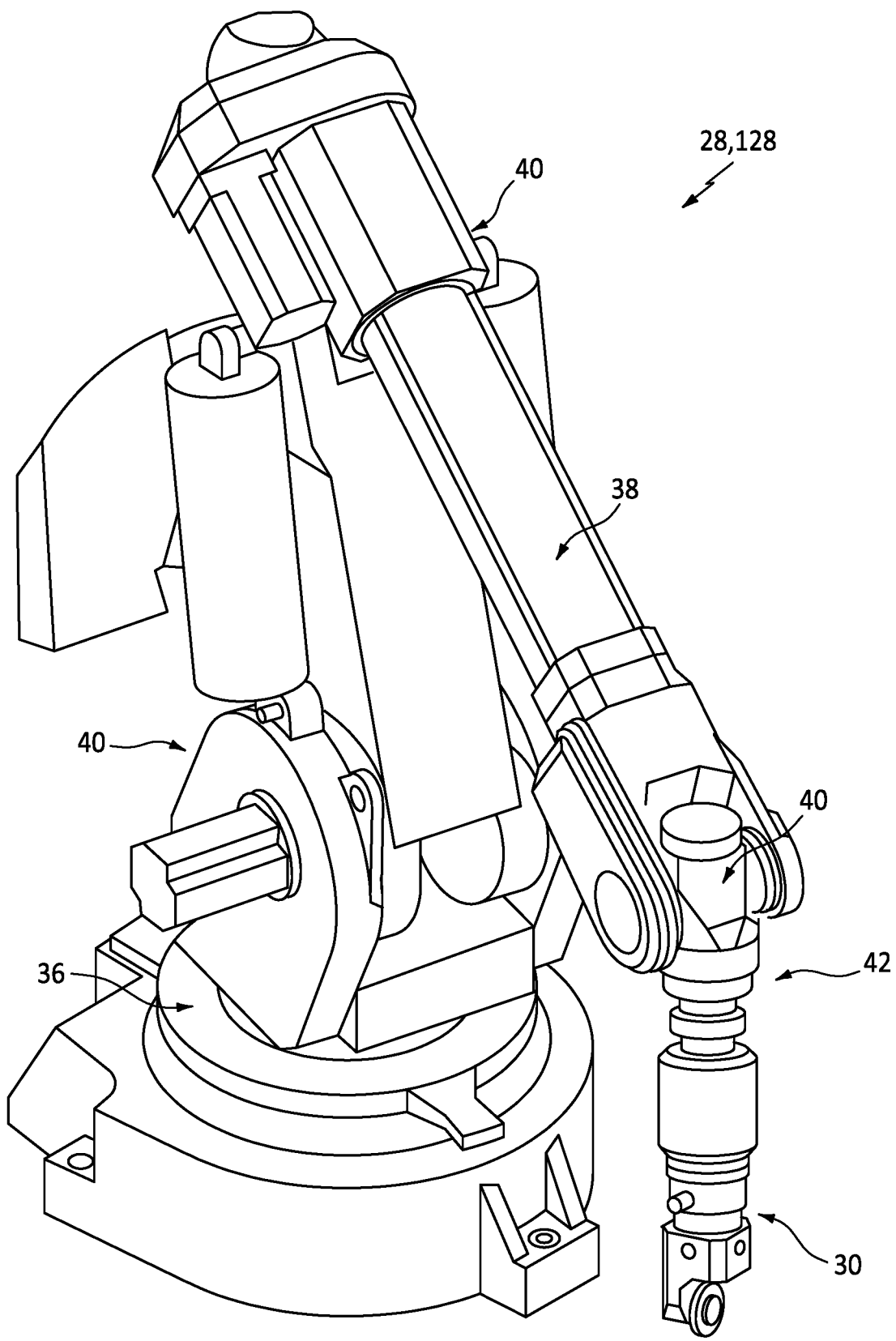
FIG. 2 is a diagrammatic representation of robotic assembly embodiment of a multi-axis powered machine.
Figure 3:
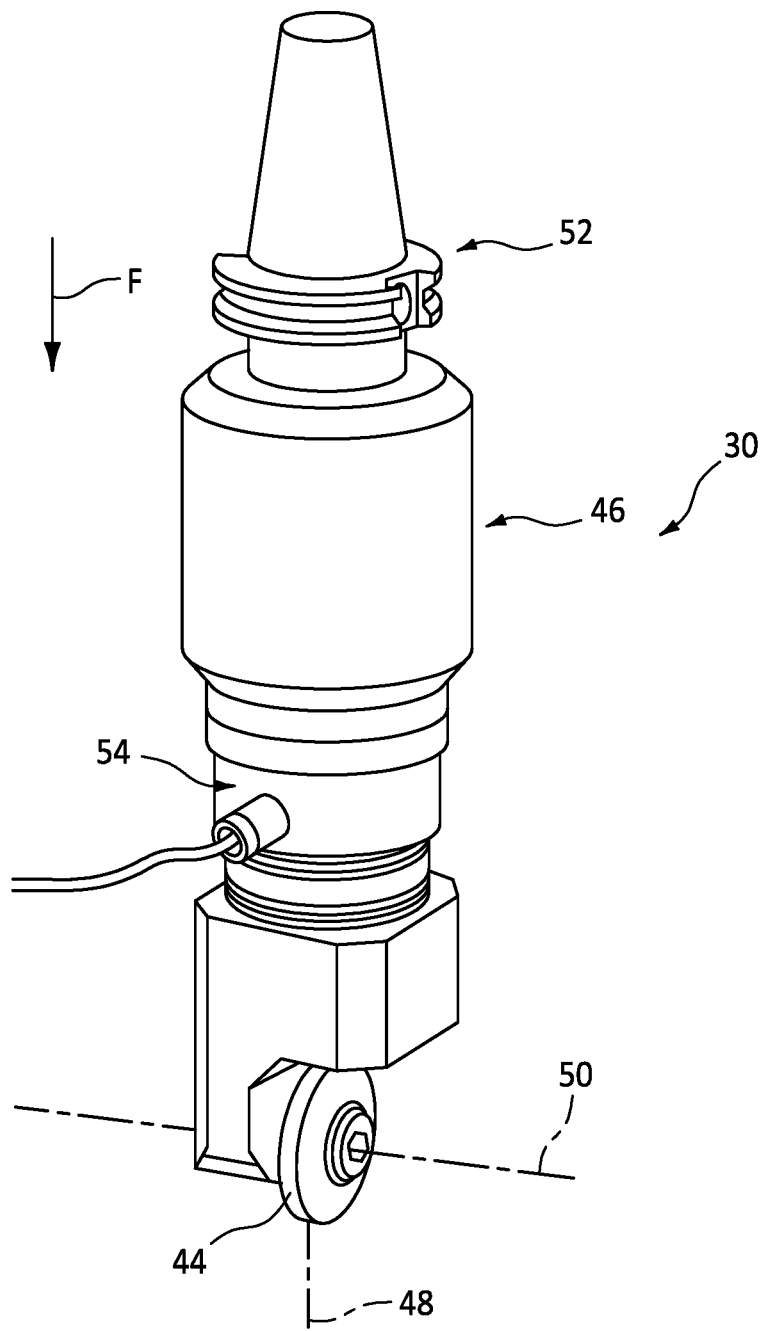
FIG. 3 is a diagrammatic representation of a deep rolling tool embodiment.
Figure 4:
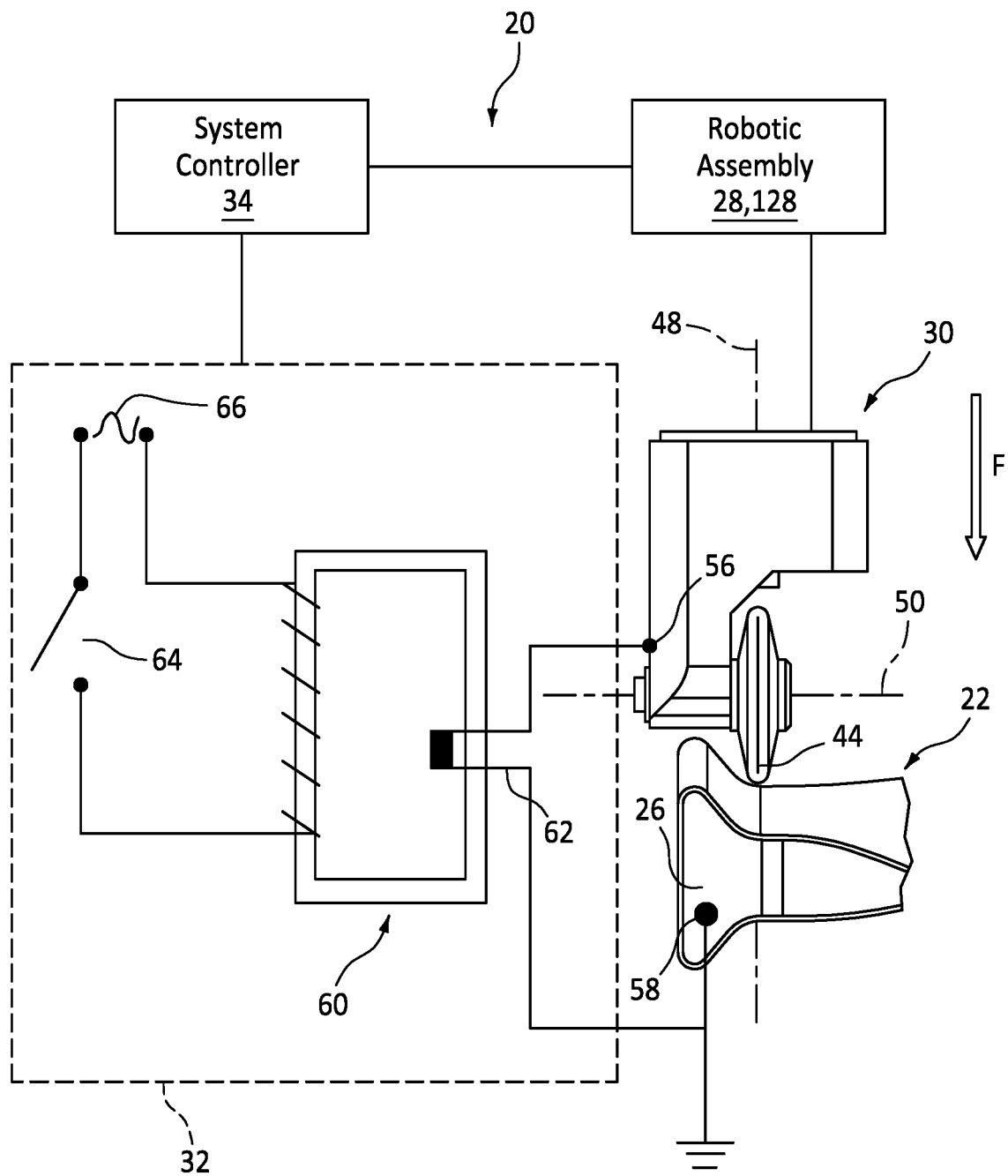
FIG. 4 is a schematic representation of a system embodiment.

Referring to FIGS. 2-4, the present disclosure system 20 includes a multi-axis powered machine 28, a deep rolling tool 30, and an electrical assist unit 32. In some embodiments, the present disclosure system 20 may include a system controller 34. In an alternative embodiment, the present disclosure system 20 may include an ultrasonic peening actuator in place of a deep rolling tool 30.

In some embodiments, the multi-axis powered machine 28 may be configured to hold and actuate the deep rolling tool 30 in multiple degrees of freedom relative to a stationary workpiece 22. The multi-axis powered machine 28 may be configured to operate in two or more axes of motion; e.g., up to twelve axes of motion that include multiple axes of translation, multiple axes of rotation, and the like. In some embodiments, a multi-axis powered machine 28 may be configured to hold and actuate the workpiece 22 in multiple degrees of freedom relative to a stationary deep rolling tool 30. The roller of the deep rolling tool can be made from tool steel, or tungsten carbide materials, or the like.

Figure 5:
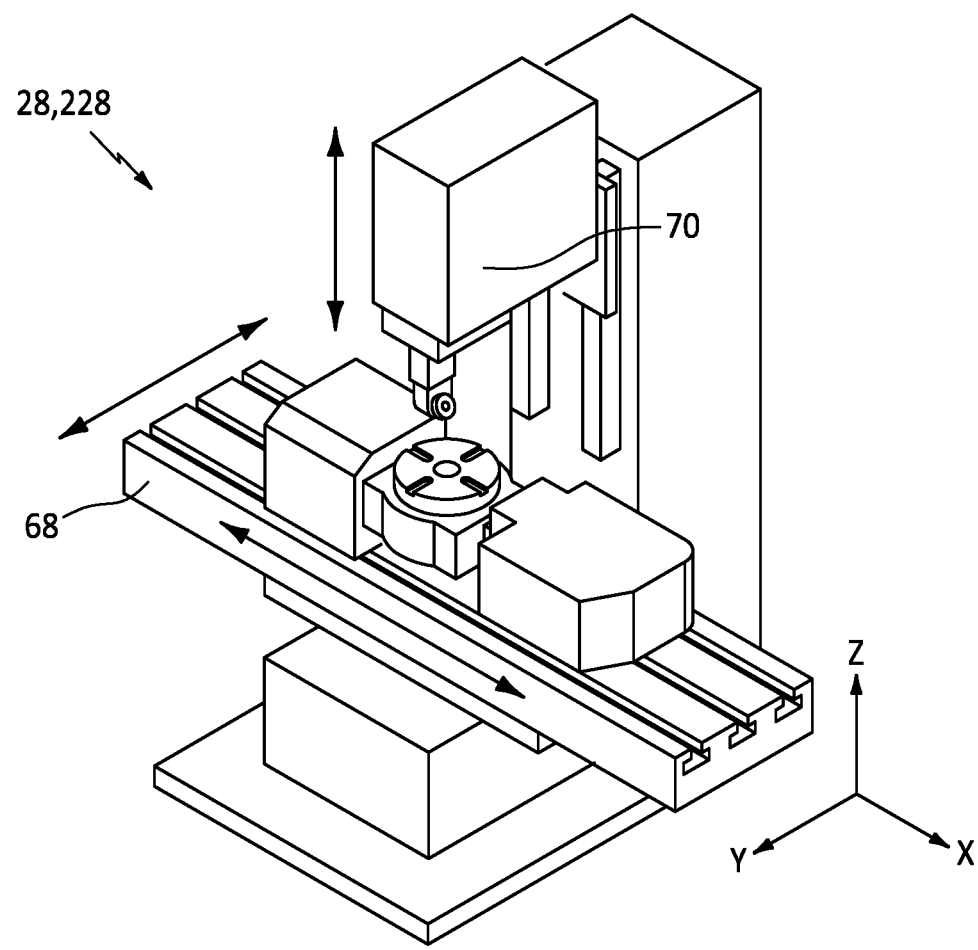
FIG. 5 is a diagrammatic representation of computer numerical control machine embodiment of a multi-axis powered machine.

A non-limiting example of a multi-axis powered machine 28 that may be used with the present disclosure is a multi-axis robotic assembly 128 as diagrammatically shown in FIG. 2. Robotic assemblies typically include a base 36 connected to plurality of arms 38 connected in series by multi-axis joints 40. The arms 38 extend collectively extend from the base 36 to a working end 42 where a tool, an actuator, or other implement may be attached. The robotic assembly's 128 degrees of movement is typically a function of the number of arms 38 and joints 38 possessed by the robotic assembly 128. A multi-axis robotic assembly 128 may, for example, be configured to hold and apply a deep rolling tool 30 (attached to the working end 42) relative to a stationary workpiece 22 in multiple axes of orientation and translation. Conversely, a robotic assembly 128 may be configured to hold and apply a workpiece 22 relative to a stationary deep rolling tool 30 in multiple axes of orientation and translation. Another non-limiting example of a multi-axis powered machine 28 configured to hold and actuate a deep rolling tool 30 is a multi-axis machine tool; e.g., a multi-axis computer numerical control (CNC) machine 228 as diagrammatically shown in FIG. 5. Multi-axis CNC machines typically accomplish multi-axis operation by moving a workpiece table 68 (and attached work piece) relative to the head 70 of the machine tool. The above examples of multi-axis powered machines 28 may be described as a unitary device.

In some embodiments, the multi-axis powered machine 28 may comprise a plurality of machine components that operate in coordinated fashion to achieve multi-axis application of a deep rolling tool 30. For example, a first multi-axis powered machine component may be configured to hold one of a workpiece 22 or a deep rolling device and is capable of movement (i.e., rotational or translational) in a first set of axes and a second multi-axis powered machine component may be configured to hold the other of the workpiece 22 or deep rolling device and is capable of movement (i.e., rotational or translational) in a second set of additional axes. Collectively, the first and second multi-axis powered machine components make it possible to apply the deep rolling tool 30 to the workpiece 22 in a collective number of axes (first plus second set of axes) greater than that possible with either multi-axis powered machine component individually. In these embodiments, the plurality of machine components may include a machine tool and a robotic assembly, or a pair of robotic assemblies, or the like.

Multi-axis robotic assemblies and multi-axis computer numerical control (CNC) machines are known, and the present disclosure is not limited to any particular embodiment thereof.

The deep rolling tool 30 may assume a variety of different configurations, some including a single roller 44 and others including a plurality of rollers 44. A non-limiting example of a deep rolling tool 30 is diagrammatically shown in FIG. 3. This deep rolling tool 30 embodiment has a shaft assembly 46 extending along a central axis 48 and a roller 44 disposed at the distal end of the shaft assembly 46, rotatably mounted on an axis 50 that is disposed perpendicular to the central axis 48. In some embodiments, a roller 44 may be retained within a holder and configured to roll relative to that holder rather than an axle. The present disclosure is not limited to any particular roller 44 mounting configuration or orientation. The shaft assembly 46 may be a rigid assembly or the roller 44 may be spring mounted. As will be described herein, the deep rolling tool 30 may be translated in a direction parallel to the central axis 48 to apply the roller 44 against a workpiece 22 with a normal force. The deep rolling tool 30 is shown with optional elements including a tool holder 52 mounted to a proximal end of the shaft assembly 46 and a load cell 54. The tool holder 52 is configured to facilitate attachment of the deep rolling tool 30 to the working end 42 of the robotic assembly 128. The load cell 54 may be configured to measure the force applied by the roller 44 against a workpiece 22. The load cell 54 may be in communication with a system controller 34 by wired and/or wireless connection. The present disclosure is not limited to any particular deep rolling tool 30 configuration.

The one or more rollers 44 may comprise a material having a hardness greater than the hardness of the workpiece 22 being processed. A non-limiting example of a roller 44 material may be a hardened steel alloy, or a carbide such as a tungsten carbide, or the like. The present disclosure is not limited to any particular roller 44 material. The one or more rollers 44 may be configured in a variety of different geometric configurations. For example, a roller 44 may be a body having a rotational axis; e.g., a spherical roller, a cylindrical roller, a crowned roller, a disk-like roller, or the like. The present disclosure is not limited to any roller 44 geometric configuration.

The electrical assist unit 32 is configured to selectively apply a pulsed electrical current ("electro-pulsed" current) to the workpiece 22 simultaneously with a plastic deformation process applied to the workpiece 22; e.g., deep rolling as will be described herein. The electro-pulsed current may be pulsed direct current (DC) or may be pulsed alternating current (AC). In those applications that use electro-pulsed AC, the AC current is typically at very high frequency and magnitude. The electrical assist unit 32 can be controlled to selectively apply an amount of electrical current to the workpiece 22 sufficient to create an electroplastic effect (EPE) at the surface and within the near surface of the workpiece 22 during the plastic deformation process, while reducing the required normal force. The EPE may be described as a reduction in flow stress and an increase in plasticity (which may be collectively referred to as a reduction in deformation resistance) that occurs with the application of electrical current to the workpiece 22. To be clear, the application of electrical current to a metallic workpiece 22 will produce some amount of Joule heating which itself may produce an increase in ductility. However, the mechanical property changes in the metallic workpiece 22 are not solely attributable to Joule heating but rather are also attributable to an additional independent mechanism (i.e., EPE) understood to be related to interaction between moving electrons and dislocations within the metallic material. The EPE, therefore, is understood to be independent of and decoupled from Joule heating. The reduction in deformation resistance associated with EPE when used with deep rolling is understood to refine the grain structure of the metal at the surface and within the near-surface region with an increase in dislocation sources and tangles associated with increased dislocation mobility. The refined grain structure and increased dislocation sources and tangles, in turn, result in an increased amount of residual compressive stress at the surface and within the near-surface regions. The increased amount of residual compressive stress produces enhanced fatigue strength; e.g., by inhibiting small crack initiation and/or propagation. Both deep rolling alone and deep rolling with electrical assist produced EPE result in some amount of work hardening at the surface and near-surface regions of a workpiece 22. However, deep rolling with electrical assist produced EPE is understood to produce a refined grain structure that extends deeper into the metal near-surface, and an increased amount of dislocation sources and tangles at the surface and that extends deeper into the metal near-surface relative to that produced by deep rolling alone.

The electrical assist unit 32 may be configured to apply the electrical current to the metallic workpiece 22 in a variety of different ways. In some embodiments, the electrical assist unit 32 may be configured to directly apply the electrical current to the metallic workpiece 22; e.g., by directly connecting the metallic workpiece 22 to the electrical current source. In some embodiments, the electrical assist unit 32 may be configured to produce an electrical current within the metallic workpiece 22 in a contactless manner; e.g., by inducing an electrical current within the workpiece 22 using an applied magnetic field.

Regarding those embodiments wherein the electrical assist unit 32 is configured to directly apply the electrical current to the metallic workpiece 22, as shown diagrammatically in FIG. 4, the electrical assist unit 32 may include a first electrical connection 56 to the deep rolling tool 30 and a second electrical connection 58 to the metallic workpiece 22. The first electrical connection 56 between the deep rolling tool 30 and the workpiece 22 may be through the roller 44 or may be through a contact device (not shown) associated with the deep rolling tool 30 that is in contact with the workpiece 22. The second electrical connection 58 may be an electrical lead that is directly attached to the workpiece 22 or connected to an element in electrical communication with the workpiece 22. The present disclosure is not limited to any particular type of first or second electrical connection 56, 58. The electrical assist unit 32 diagrammatically shown in FIG. 4 includes a transformer 60, a capacitor bank 62, a switch 64, and an AC power source 66. The electrical assist unit 32 is configured to form an electrical circuit with the metallic workpiece 22 being connected to ground. The present disclosure is not limited to this particular electrical circuit embodiment. The electrical current may be applied in a pulsed form, but the present disclosure is not limited to pulsed current application.

The system controller 34 may include any type of computing device, computational circuit, processor(s), CPU, computer, or the like capable of executing a series of instructions that are stored in memory. The instructions may include an operating system, and/or executable software modules such as program files, system data, buffers, drivers, utilities, and the like. The executable instructions may apply to any functionality described herein to enable the system to accomplish the same algorithmically and/or coordination of system components. The system controller 34 may include or is in communication with one or more memory devices. The present disclosure is not limited to any particular type of memory device, and the memory device may store instructions and/or data in a non-transitory manner. Examples of memory devices that may be used include read-only memory, random access memory, volatile memory, non-volatile memory, static memory, dynamic memory, flash memory, cache memory, and/or any device that stores digital information. The system controller 34 may include, or may be in communication with, an input device that enables a user to enter data and/or instructions, and may include, or be in communication with, an output device configured, for example to display information (e.g., a visual display), or to transfer data, etc. Communications between the system controller 34 and other system components may be via a hardwire connection or by wireless connection.

The present disclosure system 20 may be used to process newly formed components (e.g., the fan blade shown in FIG. 1), or may be used to produce new components, or may be used in the repair of existing components. FIG. 4 diagrammatically illustrates a workpiece 22 engaged with a deep roller tool 30 and in communication with an electrical assist unit 32. The workpiece 22 may be a newly formed component, or it may be a used component that has been repaired, which repair included a new surface portion.

The robotic assembly 128 and the electrical assist unit 32 may be in communication with a system controller 34. The electrical assist unit 32 may be controlled (e.g., using stored instructions executed by the controller) to produce pulsed electrical current applied to the workpiece 22 at predetermined parameters such as current density, pulse frequency, and pulse duration. At the same time, the robotic assembly 128 is controlled (e.g., using stored instructions executed by the controller) to apply the roller 44 of the deep rolling tool 30 against the surface of the workpiece 22 with a predetermined normal force and translate the roller 44 relative to the surface of the workpiece 22 to produce plastic deformation of the workpiece surface and near-surface region within a depth of up to about 2.0 mm, and particularly in the depth region of about 1.6 mm to 2.0 mm. The concurrent application of electrical current and the plastic deformation produced by the deep rolling creates an electroplastic effect (EPE) at the surface and within the near surface of the workpiece 22. As stated herein, the EPE produces a reduction in flow stress and an increase in plasticity (i.e., a reduction in deformation resistance) that facilitates the deep rolling, and also produces a refined grain structure in the workpiece metal at the surface and within the near-surface region with an increase in dislocation sources and tangles. Also as stated herein, the present disclosure deep rolling/electrical assist process is understood to produce the refined grain structure and increased dislocation sources and tangles deeper into the respective near-surface region relative to that produced by deep rolling alone. The refined grain structure and increased dislocation sources and tangles, in turn, result in an increased amount of residual compressive stress at the surface and within the near-surface regions. The increased amount of residual compressive stress produces enhanced fatigue strength; e.g., by inhibiting small crack initiation and/or propagation.

As stated above, the present disclosure system 20 may be used in the production of new components. For example, additive manufacturing (AM) processes may be used to produce components or component portions. A non-limiting example of an additive manufacturing process that may be used as part of the present disclosure is a directed energy deposition (DED) process wherein a layer of powder material is deposited, and that layer is subsequently subjected to an energy application that causes the powder material to melt and fuse into a solid. In some embodiments a laser may be used to impart the energy required to melt and fuse the powdered material. The process is repeated layer by layer until the desired body is formed. Components produced using AM processes, however, may possess mechanical property limitations; e.g., limited hardness or ductility. It is not uncommon for a material layer produced by AM processing to have tensile residual stresses, or an undesirable surface roughness making it difficult for an additional layer of additive material to bind to a previously formed layer of additive material, or to have an oriented microstructure or otherwise less than desirable microstructure.

The present disclosure system 20 may be operated in the manner described above (e.g., the electrical assist unit 32 controlled to produce pulsed electrical current applied to the AM layers, and the robotic assembly controlled to apply the roller of the deep rolling tool 30 against the surface of the AM layer) to create an electroplastic effect (EPE) at the surface and within the near-surface of the respective AM layer. This process produces a refined grain structure in the respective AM layer at the surface and within the near-surface region with an increase in dislocation sources and tangles. The refined grain structure and increased dislocation sources and tangles, in turn, result in an increased amount of residual compressive stress at the surface and within the near-surface regions. In addition, the process may produce enhanced surface smoothness characteristics. The aforesaid process may be repeated for a plurality of AM deposited layers.

As indicated above, the present disclosure may be used to process workpieces comprising a variety of different materials including, but not limited to, nickel, nickel alloys, aluminum, aluminum alloys, titanium, titanium alloys, steel, and the like. The mechanical properties of these metals and alloys differ considerably. Consequently, the amount of force required to plastically deform these different metals and alloys differs considerably. Because the range of forces required to plastically deform these different metals/alloys is substantial, it has been the case that some machines 28 (e.g., multi-axis powered machines like a robotic assembly or a multi-axis CNC machine) are capable of producing plastic deformations in some materials and not others. Of course, it is often the case that multi-axis powered machines 28 like a robotic assembly 128 can be "sized up" to increase their capability to produce plastic deformations in metallic materials. However, it may not be possible (readily or at all) to increase the capability of an existing multi-axis powered machine 28 to produce an increased amount of force. As a result, the capability of an existing multi-axis powered machine 28 may be limited (e.g., not all metallic materials can be processed) or if the capability to handle a broader spectrum of metallic materials (e.g., broader spectrum of mechanical properties) is required, it may be necessary to replace an existing machine with a new machine with increased capabilities—a proposition that is not always financially possible.

The present disclosure addresses this dilemma. We have discovered that a novel and unforeseen aspect of the present disclosure system 20 is that it can be used to produce a desirable refinement of grain structure and increase in dislocation sources and tangles using less normal force than would be required to produce the same using a conventional mechanical surface treatment. More specifically, the application of electrical current during the plastic deformation process produces a reduction in deformation resistance, which in turn decreases the required normal force for plastic deformation. Hence, a multi-axis powered machine 28 like a robotic assembly 128 that is capable of producing plastic deformations in an aluminum alloy but not capable of producing plastic deformations in a nickel alloy using a conventional mechanical surface treatment (e.g., deep rolling), may be capable of producing plastic deformations in an aluminum alloy and/or a nickel alloy under the present disclosure. More significantly and as stated herein, the present disclosure not only makes it possible to use less normal force than is required with conventional mechanical surface treatment processes, but also produces a refinement in grain structure and increased dislocation sources and tangles deeper into the respective near-surface region relative to that produced by deep rolling alone. The refined grain structure and increased dislocation sources and tangles, in turn, result in an increased amount of residual compressive stress and a concomitant enhanced fatigue strength.

In addition to the increased system utility provided by the present disclosure system 20, the present disclosure may also increase the scope of components that can be processed to achieve the desirable enhancements in grain structure refinement and increased dislocation sources and tangles deeper into the respective near-surface region. For example, certain components may be configured in a manner than presents limitations regarding the amount of normal force that can be applied to a surface; e.g., excessive normal force may cause structural failure or deficit. The ability of the present disclosure to provide a mechanical surface treatment using less normal force than is required with conventional mechanical surface treatment processes, may permit the application of a mechanical surface treatment to a component which is not possible with conventional mechanical surface treatments. As yet another example, the present disclosure provides significant utility for components that are produced and/or repaired using AM processes. As described herein, the present disclosure may be used for each layer of material deposited during an AM process. In this manner, beneficial material properties (e.g., increased residual compressive stress, enhanced surface smoothness, and the like) can be imparted to each layer and therefore throughout the body of the component being produced or repaired.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected or the like may include permanent, removable, temporary, partial, full and/or any other possible attachment option.

No element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements. It is further noted that various method or process steps for embodiments of the present disclosure are described herein. The description may present method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

The invention claimed is:

1. A mechanical surface treatment method for a metallic workpiece, the method comprising:

using a first multi-axis (FMA) powered machine to impart motion to the metallic workpiece in a first FMA axis of motion;

wherein the metallic workpiece includes a first layer of fused metallic powdered material;

using a second multi-axis (SMA) powered machine to actuate a deep rolling tool relative to the metallic workpiece in a first SMA axis of motion, wherein the first SMA axis of motion is different from the first FMA axis of motion, wherein the deep rolling tool includes a roller, and the actuating of the deep roller tool includes applying the roller against the first layer with a first normal force sufficient to plastically deform the first layer;

applying a first pulsed electrical current to the first layer concurrently with the application of the roller against the first layer, wherein the first pulsed electrical current is applied in a manner that produces an electroplastic effect at a surface of the first layer and a first near-surface region contiguous with the surface of the first layer, the electroplastic effect and the plastic deformation of the first layer producing a refinement in a grain structure of the first layer and an increase in dislocation sources and tangles within the grain structure of the first layer;

subsequent to the application of the roller to the first layer of fused metallic powdered material, using an additive manufacturing process to produce a second layer of fused metallic powdered material disposed on the first layer of fused metallic powdered material;

using the second multi-axis powered machine to actuate the deep rolling tool to apply the roller against the second layer with a second normal force sufficient to plastically deform the second layer; and applying a second pulsed electrical current to the second layer concurrently with the application of the roller against the second layer, wherein the second pulsed electrical current is applied in a manner that produces the electroplastic effect at a surface of the second layer and a second near-surface region contiguous with the surface of the second layer, the electroplastic effect and the plastic deformation of the second layer producing a refinement in a grain structure of the second layer and an increase in dislocation sources and tangles within the grain structure of the second layer.

2. The method of claim 1, further comprising using the second multi-axis powered machine to actuate the deep rolling tool relative to the first layer and the second layer of the metallic workpiece in a second SMA axis of motion.

3. The method of claim 2, further comprising using the second multi-axis powered machine to actuate the deep rolling tool relative to the first layer and the second layer of the metallic workpiece in a third SMA axis of motion.

4. The method of claim 3, further comprising using the second multi-axis powered machine to actuate the deep rolling tool relative to the first layer and the second layer of the metallic workpiece in a fourth SMA axis of motion.

5. The method of claim 3, wherein the second multi-axis powered machine is a multi-axis robot.

6. The method of claim 1, wherein the first multi-axis powered machine is a multi-axis computer numerical control (CNC) machine.

7. The method of claim 1, wherein the applying the roller of the deep rolling tool against the first layer produces residual compressive stress within the first layer, and applying the roller of the deep rolling tool against the second layer produces residual compressive stress within the second layer.

\* \* \* \* \*